No. 828,925. PATENTED AUG. 21, 1906.
X. CAVERNO.
FILTERING SYSTEM.
APPLICATION FILED MAY 12, 1906.
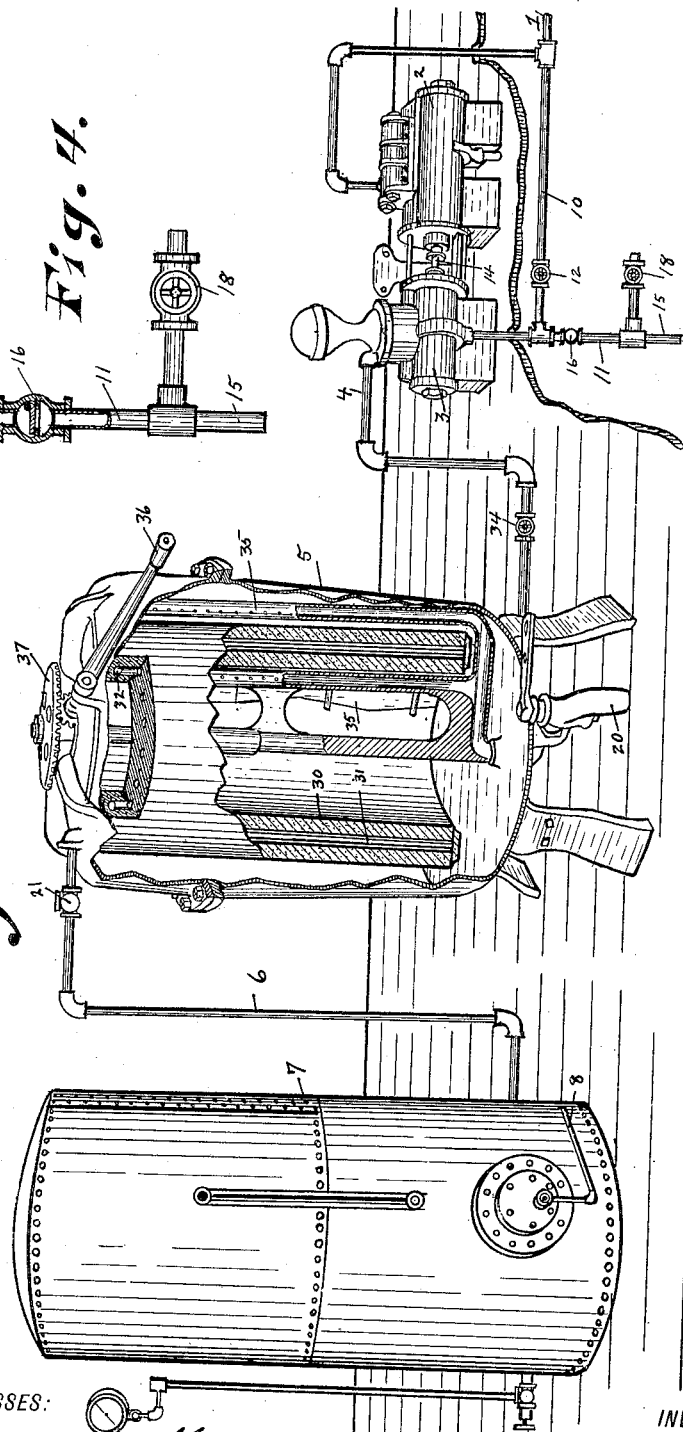
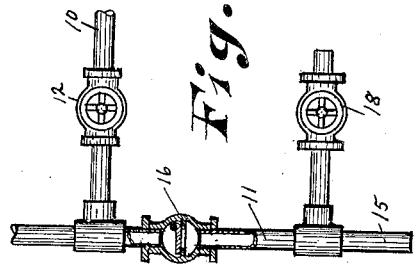
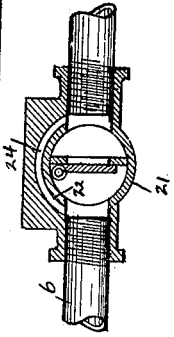
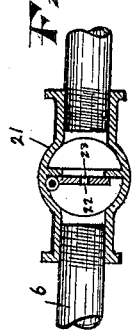
WITNESSES:
Pearl M. Grobben
O. R. Erwin
INVENTOR
Xenophon Caverno
BY Erwin & Wheeler
ATTORNEYS
THE NORRIS PETERS CO., WASHINGTON, D. C.

UNITED STATES PATENT OFFICE.

XENOPHON CAVERNO, OF KEWANEE, ILLINOIS.

FILTERING SYSTEM.

No. 828,925.  Specification of Letters Patent.  Patented Aug. 21, 1906.

Application filed May 12, 1906. Serial No. 316,441.

*To all whom it may concern:*

Be it known that I, XENOPHON CAVERNO, a citizen of the United States, residing at Kewanee, county of Henry, and State of Illinois, have invented new and useful Improvements in Filtering Systems, of which the following is a specification.

My invention relates to improvements in filtering systems.

The object of my invention is to provide a filtering system which will include an air-pressure tank for the filtered water and means operated by the water-pressure for maintaining the air-pressure in the tank and for multiplying the water-pressure through the filter, together with means for cleansing the filter by passing filtered water reversely through the filter without subjecting the filter to the full-tank pressure.

In the following description reference is had to the accompanying drawings, in which—

Figure 1 is an elevation of my invention, showing the filter partially in vertical section. Fig. 2 is a sectional view of the return-valve for flushing or cleansing the filter. Fig. 3 is a similar view, showing a modified form of valve. Fig. 4 is a sectional view of an air-inlet check-valve and the water-controlling valve regulating the intake of air.

Like parts are identified by the same reference characters throughout the several views.

Water from a main 1 is subdivided and used for both power and supply purposes in a pump having a power-cylinder 2 and a supply-cylinder 3, the pressure of the water entering the supply-cylinder at one side of the piston being applied to the water on the other side of the piston and added to the pressure of the water in the power-cylinder. The water from the supply-cylinder is delivered through a pipe 4, filter 5, and pipe 6 to a sealed storage-tank 7, from which service-pipes 8 extend to the point of use, a supply of air being kept in the storage-tank to facilitate maintaining the pressure. To deliver water from the main 1 to the power and supply cylinders of the pump, branch pipes 10 and 11 are employed, and a valve 12 controls the passage of the water to supply-cylinders 3. When the air-supply in the storage-tank is to be replenished, this valve 12 is partially closed, so that an insufficient supply of water will be furnished to cylinder 3 to fill the space in said cylinder as the piston is driven by the piston in cylinder 2 through piston-rod 14. This will tend to create a vacuum, and air will be drawn in through a suction-pipe 15 past a check-valve 16, and on the next stroke this air will be delivered through the filter to the storage-tank. Where the power-water is not to be filtered, the valve 12 may be entirely closed and the suction-pipe 15 connected with an open water-supply for the filter, in which case a valve 18 is employed, which controls an opening to the atmosphere and which may be wholly or partially opened to admit a supply of air.

The filtering-chamber is provided with a waste-cock 20, and the pipe 6 is provided with a check-valve 21, having a return-duct 22 either in the form of an aperture 23 through the valve or of a by-pass 24 around or in its seat, the duct or by-pass being of a capacity equal to the capacity of the filter at a pressure sufficient to drive impurities from the pores, but less than the full-tank pressure. The object of this arrangement is to avoid breaking the filter, which is made to withstand pressure in one direction, (*i. e.*, that of normal flow,) but not in the other direction.

The filter illustrated is what is known as a "stone" filter. A stone cylinder 30 is suspended within a closed casing, and water from the pumps passes through the outer and inner walls to tubular apertures 31, leading to an upper chamber 32, from which the pipe 6 leads to the storage-tank. The pressure is normally on both sides of the cylinder in the direction of the apertures; but when reversed by opening the waste-cock and cutting off the pump at the valve 34 the pressure is from the tubular ducts 31 outwardly, and if the full-tank pressure were exerted the stone might be broken. 35 is a scraping-frame operated by crank 36 and gearing 37 to facilitate cleansing the filter. This, however, is in common use in filters of the class illustrated and forms no part of my invention.

With the described construction it will be understood that the filter will be cleansed by opening the waste-cock 20 and closing the valve 34. When it is desired to replenish the air in the storage-tank, the valve 12 is partially closed, or if the suction-pipe 15 is connected with a water-supply the valve 12 will be entirely closed, and if air is desired the valve 18 will be opened to admit a small quantity of air for a long period or a large quantity of air for a short period, as desired.

Having thus described my invention, what I claim as new, and desire to secure by Letters Patent, is—

1. In a water supply and filtering system, the combination of a filter connected to receive water from a suitable source of supply under pressure; a water-supply reservoir; valved supply connections for conveying the purified water from the filter to said reservoir; said supply connections being provided with a duct, adapted to permit a limited return flow from the reservoir to the filter equal to the capacity of the filter at a pressure less than the reservoir-pressure; valved waste connections for the filter; and means for cutting off the supply of unpurified water to the filter.

2. In a water supply and filtering system, the combination with a filter; of a pump having power and supply chambers, each connected with a source of water-supply under pressure, and arranged to discharge water from the supply-chamber under the pressure of water in both chambers; of a supply connection leading to the filter; a sealed reservoir arranged to receive purified water from the filter; and means connected with said pump for supplying air to the reservoir through the filter.

3. In a water supply and filtering system, the combination with a filter; of a pump having power and supply chambers, each connected with a source of water-supply under pressure; and arranged to discharge water from the supply-chamber under the pressure of water in both chambers; of a supply connection leading to the filter; a sealed reservoir arranged to receive purified water from the filter; and means connected with said pump for supplying air to the reservoir through the filter; comprising a suction-inlet for the supply-chamber of the pump provided with a check-valve; and an adjustable valve, controlling the supply of water to said chamber.

4. In a water supply and filtering system, the combination of a filter; a sealed chamber connected to receive purified water therefrom; a pump connected to supply unpurified water to the filter; and a suction-pipe connected with the pump and provided with a check-valve; and an opening to the exterior atmosphere; together with means for controlling the flow of water to the pump.

In testimony whereof I affix my signature in the presence of two witnesses.

XENOPHON CAVERNO.

Witnesses:
ELMER W. SMITH,
BEN C. PARKINSON.